United States Patent [19]

Liebl

[11] Patent Number: 4,830,809
[45] Date of Patent: May 16, 1989

[54] METHOD FOR MAKING FLEXIBLE LINK BELTS

[75] Inventor: Rudolf Liebl, Altstaetten, Switzerland

[73] Assignee: EgoKiefer AG, Altstaetten, Switzerland

[21] Appl. No.: 63,244

[22] Filed: Jun. 15, 1987

Related U.S. Application Data

[62] Division of Ser. No. 926,978, Nov. 4, 1986, Pat. No. 4,705,469.

[30] Foreign Application Priority Data

Nov. 6, 1985 [CH] Switzerland ............... 4767/85
Sep. 23, 1986 [CH] Switzerland ............... 3813/86

[51] Int. Cl.$^4$ ............... B29C 45/36; B29C 45/14
[52] U.S. Cl. ............... 264/257; 264/160; 264/167; 264/251; 264/273; 264/278
[58] Field of Search ............... 264/251, 273, 160, 257, 264/167, 275, 278; 425/117, 122, 127, 129 R, 233, 236, 408, 444, 554, 556, 577

[56] References Cited

U.S. PATENT DOCUMENTS

| | | | |
|---|---|---|---|
| 2,291,545 | 7/1942 | Ganz et al. | 264/257 X |
| 2,335,222 | 11/1943 | Storch | 264/257 X |
| 2,415,961 | 2/1947 | Nast | 264/257 X |

FOREIGN PATENT DOCUMENTS

1239162  7/1960  France .................. 264/251

Primary Examiner—Jan H. Silbaugh
Assistant Examiner—Kelley M. Sidwell
Attorney, Agent, or Firm—W. G. Fasse; D. H. Kane, Jr.

[57] ABSTRACT

A flexible link belt is made by injection molding link portions into and through a flexible carrier webbing, whereby the link portions are also bonded to each other through holes in the webbing. The injection mold used for making the links has two mold sections each with a cavity portion corresponding to the respective link portion. The carrier webbing is held in place between the two mold sections. An injection nozzle reaches into one mold portion and a movable core reaches into the other mold portion preferably in such a position that the injection nozzle and the movable core face each other across the flexible webbing. The core distributes the injected plastics material into both mold portions and so that the plastics material must move primarily through the holes or interstices in the webbing.

2 Claims, 6 Drawing Sheets

METHOD FOR MAKING FLEXIBLE LINK BELTS

This is a division of application Ser. No. 926,978, filed Nov. 4, 1986, now U.S. Pat. No. 4,705,469.

FIELD OF THE INVENTION

The invention relates to a method for making flexible link belts.

DESCRIPTION OF THE PRIOR ART

Flexible link belts and tapes are known, for example, in the form of gear belts having different configurations for different purposes. Prior art gear belts are made as multi-layer structures forming endless loops. It is difficult to construct such multi-layer link belts. Hence, their manufacture is involved and expensive.

OBJECTS OF THE INVENTION

In view of the foregoing, it is the aim of the invention to achieve the following objects singly or in combination:

to provide a link belt which is modifiable for many different purposes in an easy manner;

to provide a link belt or tape to which the links are rigidly and permanently secured without the need for punching holes or the like through the carrier tape or belt;

to use as a carrier tape or belt a webbing in which the naturally occurring interstices or holes between the weft and warp threads are sufficient for intimately bonding the links into and through the webbing;

to provide strips or tapes on which the links are formed as snap fasteners, whereby the tapes then may be used for many different purposes;

to provide a method for manufacturing such link belts by making either one belt at a time or a plurality of belts simultaneously; and to provide an injection mold suitable for performing the present method.

SUMMARY OF THE INVENTION

According to the invention, the present link belts are manufactured by the following steps. A carrier strip or webbing is used which has naturally occurring interstices or holes therein as a result of the weaving. The interstices remaining even after a tight weaving are suitable for the present purpose. A synthetic material is injected under pressure into mold cavity portions so that the links are formed along the flexible carrier webbing with a spacing between neighboring links. Each link is formed with two link portions, one on one side of the webbing and the other link portion on the other side of the webbing. The link portions are bonded to each other through the webbing, whereby the webbing may even form a reinforcement of the links as in a fiber composite material.

The injection mold according to the invention is characterized in that a first mold section having at least one synthetic material injection nozzle is arranged on one side of the flexible carrier webbing. The first mold section is provided with a mold cavity portion corresponding to the shape of the desired link portion. The flexible carrier webbing closes the mold portion except for the interstices or holes naturally occurring in the webbing.

Preferably, the injection nozzle is located centrally in its respective mold cavity portion. The opening of the injection nozzle either directly contacts the webbing or almost contacts the webbing. The present injection mold is further characterized by a second mold section also having a mold cavity portion for cooperation with the first mentioned mold cavity portion in the first mold section across the webbing. Thus, the webbing is clamped in place between the two mold sections. A movable mold core is arranged to pass through the second mold cavity portion for cooperation with the injection nozzle across the carrier webbing. The core either directly contacts the webbing or almost contacts the webbing. Further, the core is movable perpendicularly to the longitudinal extension of the carrier webbing.

The link belt made according to the invention is characterized in that it comprises a plurality of synthetic material links spaced from one another along the belt. Each link comprises two link portions, one on each side of the belt and intimately and permanently bonded to each other through the naturally occurring interstices in the belt or webbing.

The teaching of the invention assures a permanent, non-releasable connection between the two link portions and the flexible belt or webbing without the need for first weakening the belt or webbing by making holes at the connecting points. By avoiding the making of separate holes and instead using the naturally occurring interstices or holes in a webbing, for example of glass fibers, the invention avoids any fraying of the webbing at the locations of the links. Further, manufacture is simplified by the avoidance of punching holes through the webbing.

By arranging the injection nozzle and the movable core according to the invention so that both face each other across the webbing, thereby either directly contacting the webbing or almost contacting the webbing, the core will support the webbing so that the webbing will not bulge in response to the relatively high injection pressure under which the liquid synthetic material impacts on the webbing.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
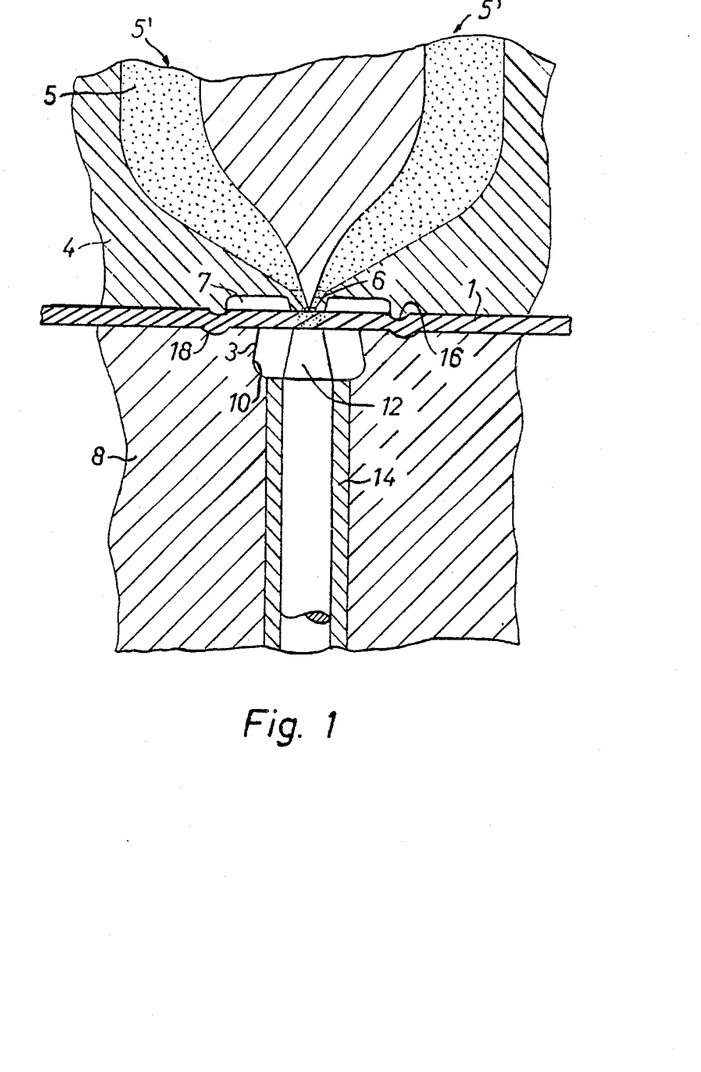
FIG. 1 is a sectional view through an injection mold according to the invention for producing members of a snap button permanently secured to a flexible carrier webbing, and showing a first phase in the injection molding process.
Figure 2:
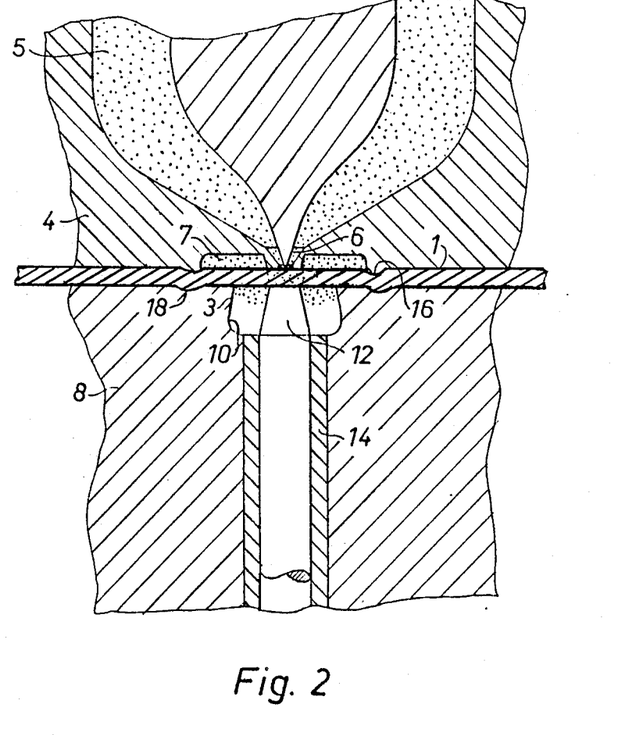
FIG. 2 is a view similar to that of FIG. 1, but showing a second phase in the injection molding process.
Figure 3:
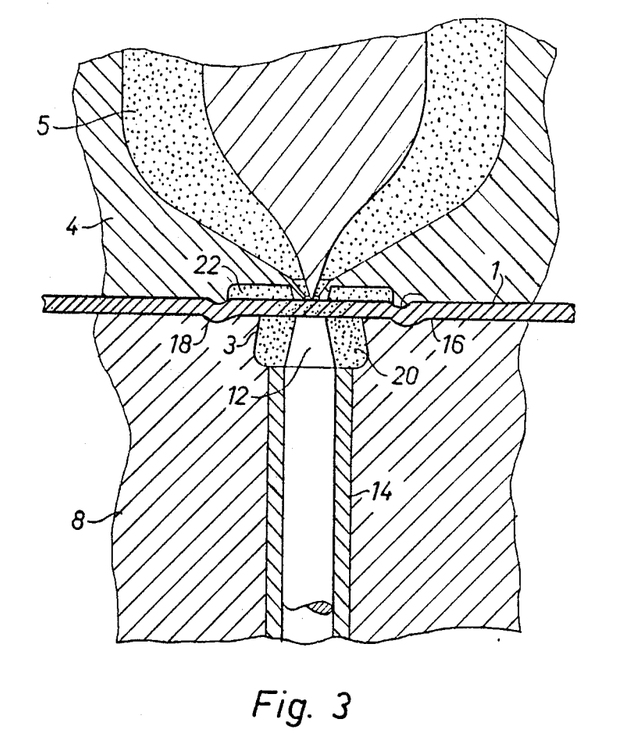
FIG. 3 is a sectional view similar to that of FIGS. 1 and 2, but showing a third phase in the injection molding process.

The injection mold used according to the invention shown in FIGS. 1 2, and 3 is suitable for manufacturing snap button components having a first or counter portion 22 and a second or male portion 20. The female snap button components are manufactured in the same manner and hence the respective injection mold and the manufacturing steps are not described. Each male portion has a conically back tapering outer wall 3 which will snap into a respective recess of a female snap button component.

The injection mold comprises a first upper mold section 4 and a second lower mold section 8. The upper mold section 4 comprises supply ducts 5' for supplying an injection molding material 5, such as synthetic plastics material to an injection nozzle 6. The injection nozzle 6 is located centrally in a first cavity portion 7 which cooperates with a second cavity portion 10 in the second mold section 8 to form a complete mold cavity through which the flexible carrier belt or webbing 1 extends in a manner separating the cavity portions 7 and 10 from each other. The injection nozzle 6 either directly contacts the webbing 1 or it is closely spaced from the webbing 1. The downwardly facing surface of the upper mold section 4 and the upwardly facing surface of the lower mold section 8 form means for holding the flexible carrier webbing 1 in place. An improved holding of the webbing 1 may be achieved by grooves 18 in one of the mold sections and ridges 16 cooperating with the grooves in the other mold section.

The cavity portion or portions 10 in the lower mold section 8 determine the configuration of the functional portion 20 of the snap button. The cavity portion 10 has a smaller diameter close to the webbing 1 than at its bottom to provide for the desired conical shape of the male portion 20 of the snap button for assuring the desired press fit when the male portion 20 is inserted into a respective female recess of a snap button component. The cavity portion 7 forms a flat ring disk shape and the ring disk is arranged coaxially relative to the lower cavity portion 10 with regard to a central vertical axis not shown. The press fit provided by the ridge 16 and by the groove 18 makes sure that a sharp boundary is provided along the circumferential edge of the ring disk 7. An axially movable core 12 mounted for an axial sliding movement in an ejector 14 passes with its upper, preferably conical end centrally into the mold cavity portion 10, preferably directly opposite the nozzle 6 so that the nozzle and the upwardly facing surface of the conical end of the core 12 face each other across the webbing 1. Preferably, the downwardly facing edge of the injection nozzle 6 and the upwardly facing surface of the core 12 directly contact the webbing 1 or are only slightly spaced from the webbing for preventing the mentioned bulging of the webbing 1 when the injection molding pressure is effective. The ejector 14 surrounds the core 12 in a movable manner. The upper end of the ejector 14 is located to form part of the cavity portion 10. Additionally, the ejector 14 is axially movable relative to the lower mold section 8 for pushing the finished male snap button portion 20 out of the cavity 10 after the core 12 has been withdrawn to easily remove the strip of the webbing 1 with its snap button components out of the lower mold section 8.

The flexible carrier webbing 1 may be woven tightly and comprises the conventional warp and weft threads. The interstices remaining even after a tight weaving form sufficient holes so that the synthetic plastics material injected under pressure into the webbing 1 will pass through the webbing 1 for filling the ring cavity portion 7 and the further cavity portion 10, whereby the upper end of the core 12 sufficiently supports the webbing 1 so that the webbing 1 will be prevented from bulging downwardly in response to the injection molding pressure which causes the liquid, hot synthetic molding material to pass through the interstices or holes in the webbing for completely filling the cavity portions 7 and 10.

During the first phase of the injection molding the hot liquid synthetic material under pressure will first enter into the interstices as shown in FIG. 1. Due to the counter holding by the core 12 the material must yield in a horizontal lateral direction, whereby it will pass through the interstices in the carrier webbing 1 and out again into the cavity portions 7 and 10. First, the cavity 7 will be filled and thereafter the cavity 10 will be filled in a second phase of the injection molding operation as shown in FIG. 2.

At the end of the second phase, both cavities are completely filled as shown in FIG. 3. Thereafter, the two snap button portions 20 and 22 are intimately bonded to each other through the webbing 1 which may even form a reinforcement of the snap button component. After curing, the mold sections 4 and 8 are separated from one another, the core 12 is withdrawn and the ejector 14 is moved upwardly to eject the snap button component 20, 22 from the cavity 10 together with the webbing 1. The synthetic material is sufficiently elastic so that it will assume the shape it had within the cavity 10 after it has passes out of the cavity 10 through the narrowest cross-section at the top of the cavity 10.

Where a single injection mold is used as just described, the carrier webbing 1 may be automatically stepped in synchronism with the operation of the mold sections 4 and 8 so that the snap button components are uniformly spaced from one another along a strip, tape, or belt of the webbing 1.

However, production efficiency may be substantially increased if several injection molds are arranged in a row so that a plurality of webbings 1 may be passed in parallel through such an injection mold. A wide strip of webbing may also be passed through such a mold and the webbing may then be cut between rows of links so formed in the wide webbing. In any event, the number of snap button components arranged in a row or rows on the carrier webbing may be selected as desired. Further, a plurality of injection molds may be arranged in rows and columns so as to form, for example six, snap button components in a row with four or more rows of such components being arranged in side-by-side relationship.

Snap button tapes or belts as just described are useful for many purposes. A preferred use is made in connection with the hanging of curtains. A strip with one type of said fastener components is secured to the curtains, for example, by stiching the opposite type of fastener components is secured, for example, to the curtain rod, for example in the form of so-called gliders capable of riding back and forth along a rail forming part of the curtain rod. The flexibility of the webbing 1 permits the formation of the customary curtain folds without interfering with such formation. Since there are not metal parts in the snap button strips according to the invention it is possible to wash the strips along with the curtains without any danger of damaging or destroying the washing machine, especially its drum, and without any danger of destroying any surface coating that may have been applied to the snap button components.

Figure 4:
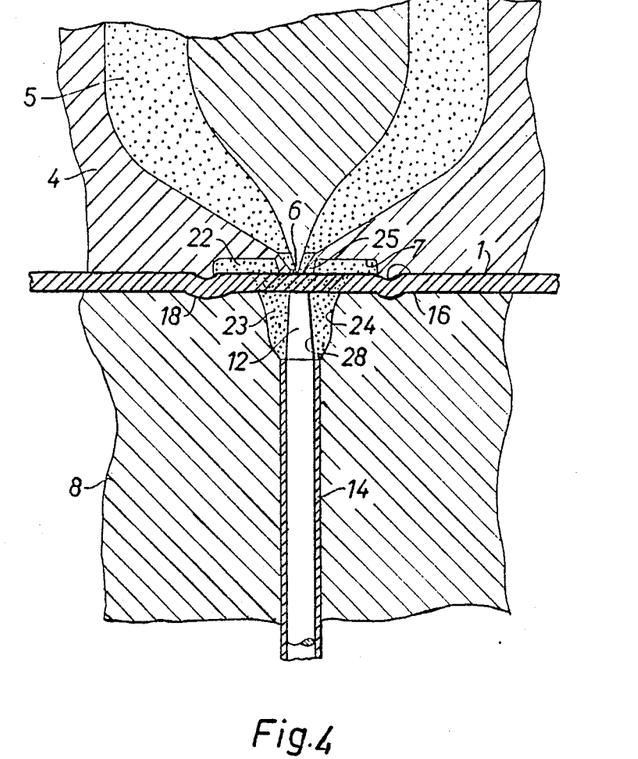
FIG. 4 is a view similar to that of FIGS. 1, 2, and 3, but illustrating a mold for the production of link belts in which the links are teeth to form a gear belt.

FIG. 4 show an injection mold for manufacturing and securing of gear teeth to a flexible tape or belt. The injection mold of FIG. 4 has the same construction as that shown in FIGS. 1 to 3. Merely the cavity 24 has the shape of the desired tooth rather than that of a snap button.

Here again, the webbing 1 may be of the tightly woven type having warp and weft threads. In spite of such tight weaving there remains interstices or holes between the threads in the webbing which are hardly visible by the bare eye. Yet, it has been found that these small interstices or holes are sufficient for the liquid, hot synthetic molding material to pass through the webbing 1 under the high injection molding pressure. The webbing 1 thus does not require any separate perforation step for making holes in those places where the teeth are to be attached. The counter portion for the tooth 23 is the same as that for the snap button and therefore is also referred to by reference number 22. The counter portion 22 is permanently bonded through the webbing 1 with the tooth 23 when the injection molding operation is completed, and the plastics material has been cured.

The core 12 is then withdrawn and the tooth 23 pushed out of the cavity 24 with the aid of the ejector 14 after the mold sections 4 and 8 have been separated. Depending on the shape of the teeth 23, it may not be necessary to provide an ejector 14 or it may be possible to accomplish the ejection by bursts of air under pressure. The core 12 has flat slightly slanted side walls 28 which are easily withdrawn either during or after the injection molding as will be described below with reference to FIGS. 9a and 9b.

Synthetic plastics material suitable for making snap button components as well as teeth 23 and counter portions 22 comprise thermoplastic materials such as polyamide (Nylon 6) acetyl resin (copolymer or homopolymers), polyethylene, and polyester materials.

The warp and weft threads of the webbing 1 are also made of the same or a similar compatible thermoplastic, heat weldable synthetic material such as polyester, polyamide, polypropylene, or polyethylene. Thus, the bonding between the counter portion 22 and the snap button portion 20 or with the teeth 23 and with the material of the webbing is very strong and permanent. In order for the counter portion 22 to assume the outline or shape or curvature of a pinion, it is sufficiently thin to have the required flexibility.

The injection molding pressure applied, according to the invention is preferably within the range of 300 to 800 bar and will depend on the type material used. For example, when polyester is used the injection molding pressure is near to the lower end of the range, while it is near to the upper range for acetyl resins.

An efficient cost effective manufacturing is accomplished when for each injection molding operation a plurality of links are formed, for example four to six in a row with predetermined spacings between neighboring links along the belt 1. The teeth 23 and the counter portions 22 are spaced in accordance with the cavities distributed around the circumference of a pinion as shown for example in FIG. 7.

Further, the injection molding tool is constructed to comprise several nozzles arranged in a pattern so that a plurality of webbings or a wide webbing may be passed through the tool. Thus, for example, a plurality of injection nozzles 6 may form the respective plurality of links in a webbing 1 at the same time. Upon completion of one injection molding step, the webbing strips or a wide webbing strip will be advanced for performing further injection molding steps in which a plurality of links are formed simultaneously. The feed advance is such that the on-center spacing of all links formed will be uniform.

Figure 5:
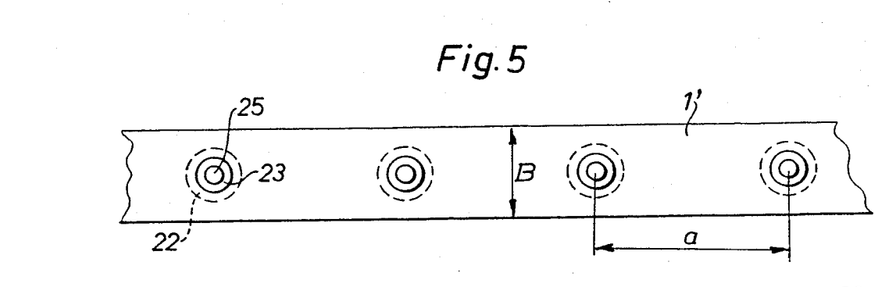
FIG. 5 is a plan view onto a portion of a link belt according to the invention provided with gear teeth having a circular top plan configuration.
Figure 6:
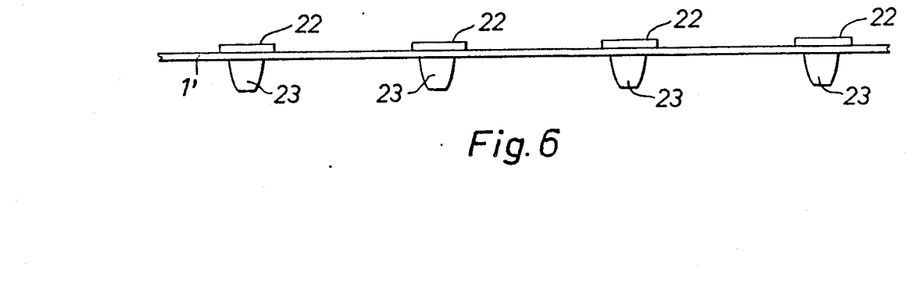
FIG. 6 is a side view of FIG. 5 showing the configuration of the gear teeth.

FIGS. 5 and 6 illustrate a gear belt 1' carrying a plurality of teeth 23 intimately bonded to the counter elements 22 through the webbing forming the belt 1'. The teeth 23 are round in their cross-section and have an evolvent configuration. Compared to conventional gear belts, the teeth according to the invention have a larger on-center spacing "a" along the belt 1'. For example, the on-center spacing "a" may be three times the length of a conventional pitch. The on-center spacing or pitch "a" is also larger than the width "b" of the belt 1'. Such a transport or conveyor belt may be provided on its side opposite the teeth with entraining elements or the like not shown. Even the counter elements 22 may function as entraining elements for material to be transported on the belt 1'.

Figure 7:
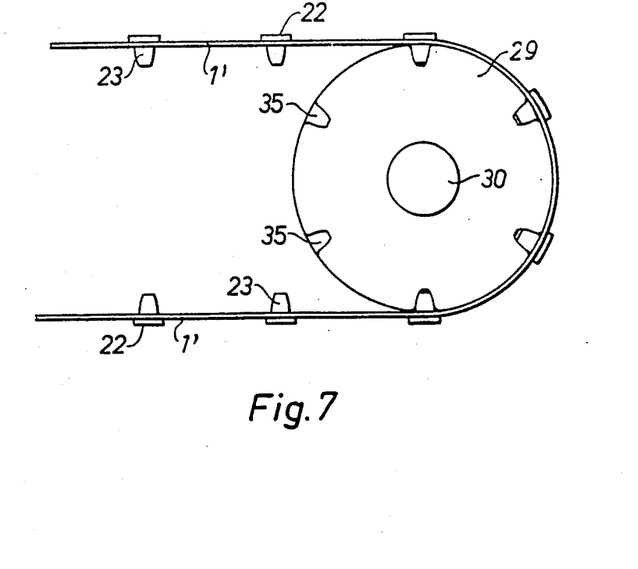
FIG. 7 shows a gear belt according to the invention, cooperating with a pulley constructed for cooperation with a gear belt according to the invention.

The drive pinions 29, one of which is shown for example in FIG. 7, have normally only a few recesses 35 for engagement by the teeth 23. The on-center circumferential spacing between neighboring recesses 35 corresponds to the on-center spacing "a". However, pinions having a full number of teeth may also be used. In that case, the force transmission through the belt 1' will be somewhat lower since not every tooth on the pinion will be engaged in a frictional force transmission. As shown in FIG. 7 the pinion 29 is secured to a shaft 30 which may be an idling shaft or a drive shaft. The tooth pitch corresponding to the on-center spacing "a" on the pinion 29 and on the belt 1' may be selected as desired. However, attention must be paid to the requirement that at least one tooth 23 must be engaging a recess 35 of the pinion 29 for any given looping angle of the belt 1' around the pinion 29.

Figure 8:
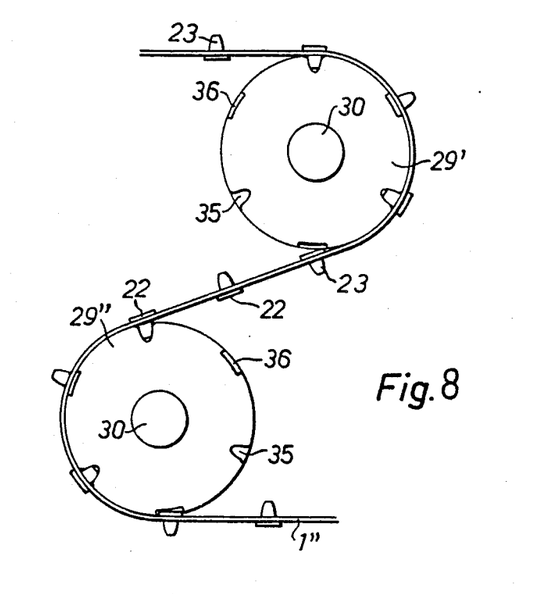
FIG. 8 shows a gear belt according to the invention in which the links forming the gear teeth face away from the gear belt in alternate opposite directions so that the gear belt may run across two or more pulleys rotating in opposite directions.

FIG. 8 illustrates a link belt in which the links or teeth project alternately from opposite sides of the belt 1", whereby two pinions 29' and 29" can be driven in synchronism, yet in opposite directions. The pinions 29' and 29" are provided, in addition to the recesses 35, with further recesses 36 in which the counter elements 22 are accommodated while the belt 1" passes over the respective pinion. If the counter elements 22 should not participate in the force transmission, the size of the recesses 36 will be slightly larger than the size of the counter elements 22.

Figures 9A, 9B:
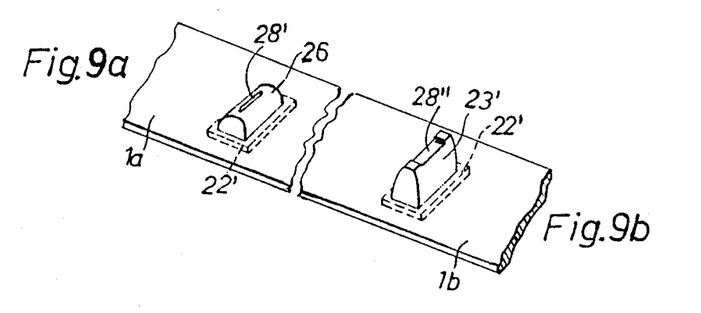
FIG. 9a and 9b show two differently shaped links or rather teeth on respective gear belts.

FIG. 9a illustrates a gear belt 1a carrying teeth 26 produced as described above, and intimately bonded to the counter element 22' through the webbing forming the belt 1a. The core 12 shown in FIG. 4 is so shaped that its side surfaces 28 leave a slot 28' in the tooth 26. The length of the slot 28' in the direction of the length of the tooth 26, that is, in the direction of the width of the belt 1a, is shorter than the length of the tooth 26.

The formation of a slot 28', can be avoided by beginning to withdraw the core 12 with its side walls 28 before the completion of the injection molding. Thus, the core 12 would be gradually withdrawn to form a slight flat recess 28" as shown in FIG. 9b. The tooth 23' is again intimately bonded to the counter element 22' through the belt 1b. The cross-section of the core 12 with its side walls 28 would be rectangular and if it is not desired to gradually withdraw the core during the injection molding, the core can be withdrawn at the end of the injection molding, thereby leaving a rectangular opening in the tooth 23'.

Pinions for cooperation with gear belts 1a and 1b may be in the form of sprocket wheels modified so as to have teeth of shortened height. In other words, the tips of the teeth are removed. Such a sprocket wheel may be provided with lateral radially outwardly extending flanges to keep the belt trained on the sprocket wheel.

Incidentally, the teeth 23 shown in FIGS. 5 and 6 could have semispherical configurations with circular cross-sections. Further, the counter elements 22, 22' could have different shapes. They could, for example, be oval or hexagonal. If desired, and depending on the intended use, the webbing 1 could be made of hemp fibers or of cotton or the like.

In order to make the belts endless, their ends could be heat welded to one another where synthetic material belts are used, or conventional connecting clamps can be used for this purpose.

Although the invention has been described with reference to specific example embodiments, it will be appreciated, that it is intended to cover all modifications and equivalents within the scope of the appended claims.

What I claim is:

1. A method for making a flexible link belt including a flexible carrier webbing having naturally occurring interstices or holes therein, and a plurality of links intimately bonded into and through said carrier webbing so that a first link portion of each link extends from one side of said carrier webbing while a respective second link portion of each link extends from the other side of said carrier webbing, comprising the following steps:

(a) inserting said flexible carrier webbing with its interstices or holes into an open injection mold having a first mold section and a second mold section, each first mold section having a plurality of first mold cavities, each second mold section having a plurality of second mold cavities, said first and second mold cavities being arranged in rows for forming said first and second link portions respectively, each first mold cavity comprising an injection nozzle means and each second mold cavity comprising movable core means located substantially opposite and substantially centrally relative to said first and second mold cavities and relative to said injection nozzle means, said first link portions being formed in said first mold cavities, said second link portions being formed in said second mold cavities, (b) closing said mold sections whereby said core means can contact said flexible carrier webbing for supporting said flexible carrier webbing, (c) supporting said flexible carrier webbing by said movable core means and injecting under pressure a synthetic plastics material into said first and second mold cavities of said injection mold so that said synthetic plastics material penetrates through said holes or interstices in said flexible carrier webbing for filling at least partially simultaneously said first and second mold cavities, whereby said core means prevent said flexible carrier webbing from bulging under an injection molding pressure, (d) completely filling said first and second mold cavities, whereby said first and second link portions are bonded to each other and to said flexible carrier webbing passing through the respective link belt, and whereby said movable core means provide each second link portion with a respective recess, (e) opening said mold sections and withdrawing said core means from the respective recess, (f) ejecting the link portions from the mold cavities, and advancing said flexible carrier webbing with its links relative to said injection mold.

2. The method of claim 1, further comprising molding said second link portions with a back-tapering outer wall, whereby said recess formed by said core means facilitates the ejecting of said second link portions from said second mold cavities.

* * * * *